United States Patent

Okamura et al.

Patent Number: 5,249,759
Date of Patent: Oct. 5, 1993

[54] TAPE CASSETTE CASING HAVING BIASING ELEMENT FOR IMPROVED TRAVELING AND TAKE-UP OF MAGNETIC TAPE

[75] Inventors: Masatoshi Okamura; Takashi Namioka, both of Saku, Japan

[73] Assignee: TDK Corporation, Japan

[21] Appl. No.: 837,818

[22] Filed: Feb. 18, 1992

Related U.S. Application Data

[63] Continuation of Ser. No. 573,495, Aug. 27, 1990, abandoned.

[30] Foreign Application Priority Data

Aug. 28, 1989 [JP] Japan .................. 1-99065

[51] Int. Cl.[5] .......................................... G11B 23/087
[52] U.S. Cl. ........................................ 242/199; 360/132
[58] Field of Search ................ 242/199, 197; 360/132

[56] References Cited

U.S. PATENT DOCUMENTS

| | | | |
|---|---|---|---|
| 3,912,194 | 10/1975 | Chan | 242/199 |
| 4,191,984 | 3/1980 | Tsukidate et al. | 242/199 |
| 4,328,936 | 5/1982 | Bordignon | 242/199 |
| 4,563,718 | 1/1986 | Shirako | 242/199 |
| 4,681,280 | 7/1987 | Duurland et al. | 242/199 |
| 4,881,146 | 11/1989 | Bordignon | 242/199 |

FOREIGN PATENT DOCUMENTS 2062458  7/1972  Fed. Rep. of Germany .

Primary Examiner—Daniel P. Stodola
Assistant Examiner—John Q. Nguyen
Attorney, Agent, or Firm—Steinberg & Raskin

[57] ABSTRACT

A tape cassette capable of ensuring smooth and positive traveling of a magnetic tape in a casing. Sheet elements each are formed with a pair of apertures aligned with hub holes and a strip-like projection projecting toward the inner surface of a casing, which is formed on each of the upper and lower inner surfaces thereof with a land of a width larger than the diameter of the hub hole in a manner to face the projection of the sheet element. The casing is also formed on each of the upper and lower inner surfaces thereof with a pair of recesses in a manner to interpose the land therebetween and the sheet elements each have a pair of end edges extending in the longitudinal direction thereof, which are arranged so as to overhang the recesses of the casing.

5 Claims, 7 Drawing Sheets

TAPE CASSETTE CASING HAVING BIASING ELEMENT FOR IMPROVED TRAVELING AND TAKE-UP OF MAGNETIC TAPE

This is a continuation of application Ser. No. 07/573,495, filed Aug. 27, 1990, now abandoned.

BACKGROUND OF THE INVENTION

This invention relates to a tape cassette, and more particularly to a tape cassette which ensures smooth and positive traveling of a magnetic tape in a casing.

In a conventional tape cassette, as shown in FIGS. 7 and 8, lubricant sheet elements 100 formed by drawing are interposedly arranged between a casing 102 and tape windings 104 each constituted by a hub and the portion of a magnetic tape wound on the hub, to thereby allow the magnetic tape to smoothly and stably travel in the casing 102 without contacting with the inner surface of the casing. The sheet elements 100 each are formed with a projection 108 by pressing for improving the traveling and taking-up of the magnetic tape as well as various holes such as apertures 110 aligned with hub holes of the casing 102 for the purpose of positioning the sheet element 100 in place in the casing 102.

The projection 108 made by pressing is merely positioned at the central portion of the sheet element 100 sufficient to cover only the hub holes of the casing 102. Also, the sheet element 100 is formed into dimensions sufficient to cause both end edges of the sheet element extending in the longitudinal direction thereof to be contacted with the inner surface of the casing 102 and cause the sheet element 100 to substantially occupy a whole tape area defined in the casing. The words "tape area" used herein mean an area in the casing which is occupied by the tape windings 106 of a maximum diameter. Thus, the sheet element fails to exhibit a satisfactory cushioning function, as well as adequately keep the balance between the rigidity of the sheet element and its cushioning properties over a wide range.

Accordingly, it is highly desirable to provide a tape cassette which is capable of eliminating the foregoing disadvantages of the prior art to ensure smooth and positive traveling of a magnetic tape.

SUMMARY OF THE INVENTION

Generally speaking, in accordance with the present invention, a tape cassette is provided. The tape cassette includes a casing formed with a pair of hub holes, a pair of hubs rotatably arranged in the hub holes of the casing, respectively, and a magnetic tape arranged between the hubs and reversibly wound on the hubs. The hubs each form a tape winding in cooperation with the portion of the magnetic tape wound thereon. The tape cassette also includes a sheet element interposedly arranged between each of the upper and lower inner surfaces of the casing and the tape winding. The sheet elements each are formed with a pair of apertures aligned with the hub holes of the casing and a projection projecting toward the inner surface of the casing. The casing is formed on each of the upper and lower inner surfaces thereof with a land of a width larger than the diameter of the hub hole in a manner to face the projection of the sheet element. The casing is also formed on each of the upper and lower inner surfaces thereof with a pair of recesses in a manner to interpose the land therebetween. The sheet element has a pair of end edges extending in the longitudinal direction thereof. The end edges of the sheet element are arranged so as to overhang the recesses of the casing, respectively.

In a preferred embodiment of the present invention, the sheet element is so formed that distances between a center line defined by connecting the centers of the apertures to each other and the end edges are within the range of about 46 to 60% of the maximum radius of the tape winding.

In a preferred embodiment of the present invention, the distances are substantially equal to each other. Alternatively, the distances may be different from each other. In this instance, the distances may be so defined that the distance between the center line and the end edge of the sheet element on the front side of the casing is smaller than the distance between the center line and the end edge of the sheet element on the rear side of the casing. Also, the distances are so defined that the ratio of the distance between the center line and the end edge of the on the front side of the casing to the distance between the center line and the end edge of the sheet element on the rear side of the casing may be about 3:4. The sheet element may be provided with at least one cutout for positioning the sheet element in the casing, wherein the cutout is preferably arranged at the portion of the sheet element having the larger distance.

The recesses of each of the upper and lower inner surfaces of the casing may be formed so as to have depths different from each other.

In a preferred embodiment of the present invention, the projection of the sheet element is formed into a strip like shape extending in the longitudinal direction of the sheet element.

Accordingly, it is an object of the present invention is to provide a tape cassette which is capable of ensuring positive and stable traveling of a magnetic tape.

It is another object of the present invention to provide a tape cassette which is capable of significantly improving the endurance of a magnetic tape.

It is a further object of the present invention to provide a tape cassette which is capable of substantially reducing damage to a magnetic tape.

It is still another object of the present invention to provide a tape cassette which is capable of ensuring satisfactory taking-up of a magnetic tape.

It is yet another object of the present invention to provide a tape cassette which is capable of significantly reducing damage to a magnetic tape to a degree sufficient to ensure stable traveling of the tape and reduce the manufacturing cost of the tape cassette.

It is a still further object of the present invention to provide a tape cassette which is capable of effectively eliminating bending of a sheet element and the like, to thereby permit the operation of incorporating it into the casing to be easily and safely carried out.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings; wherein:

FIG. 3A is a fragmentary vertical sectional view similar to FIG. 3A wherein one of sheet elements is displaced;

DETAILED DESCRIPTION OF THE PREFERRED EMBODIMENTS

Figure 1:
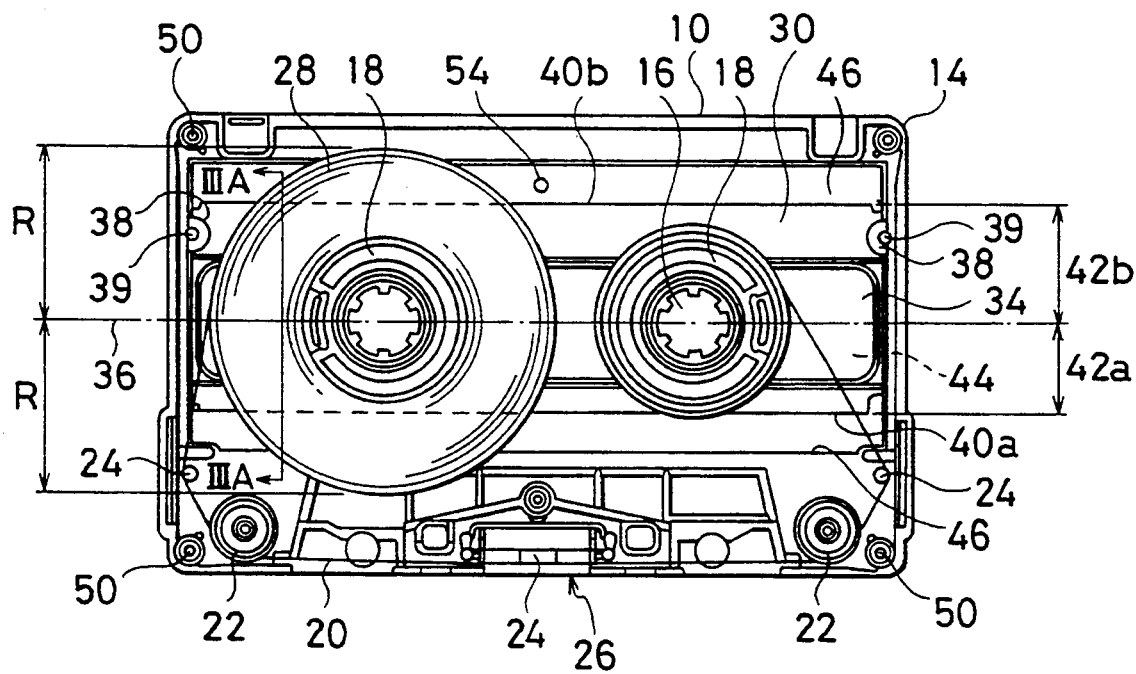
FIG. 1 is a plan view generally showing the internal structure of an embodiment of a tape cassette according to the present invention.
Figure 2:
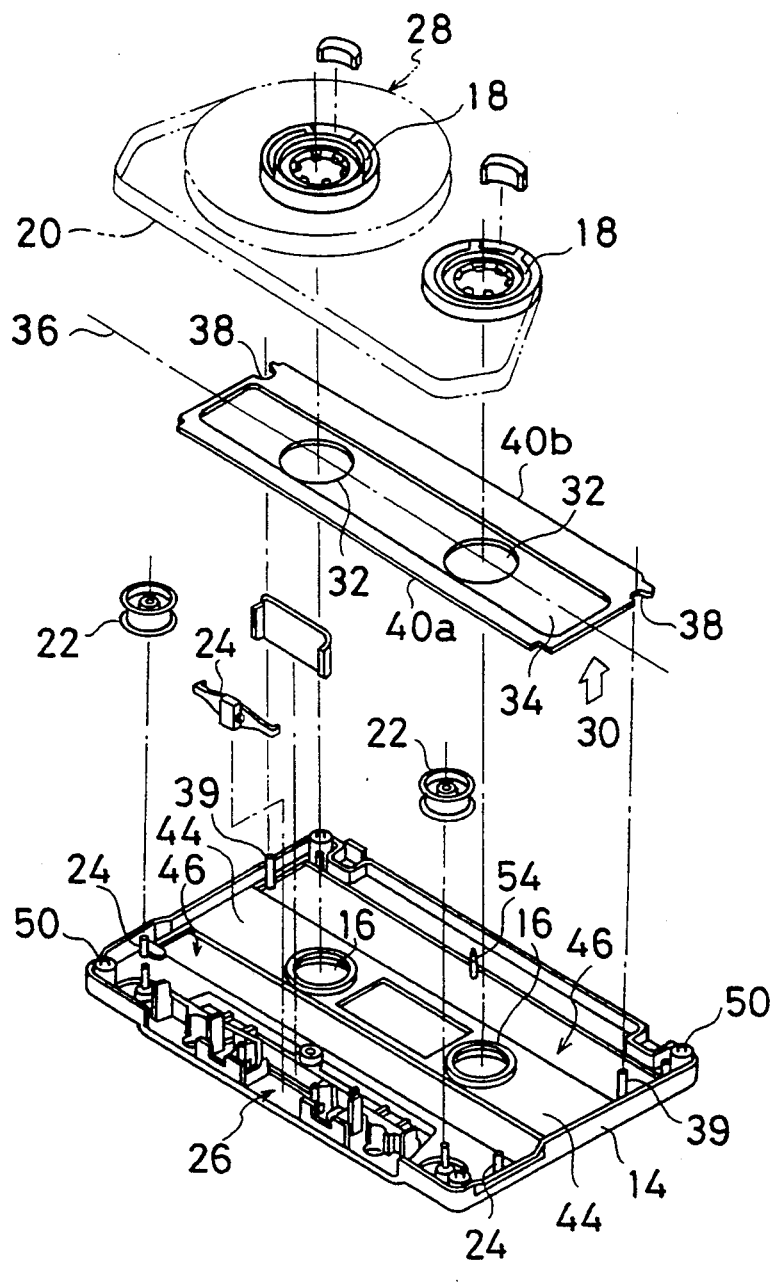
FIG. 2 is a perspective view showing the lower half of the tape cassette of FIG. 1.

Now, a tape cassette according to the present invention will be described with reference to FIGS. 1 to 6, wherein like reference numerals designate like or corresponding parts throughout.

FIGS. 1 to 3B show an embodiment of a tape cassette according to the present invention. A tape cassette of the illustrated embodiment includes a casing 10 comprising an upper casing member 12 and a lower casing member 14 joined together as described hereinafter. The upper and a lower casing members 12 and 14 each are formed with a pair of hub holes 16 in a manner to be aligned with one another, respectively, in which a pair of hubs 18 are rotatably arranged. On each of the hubs 18 is mounted each of ends of a magnetic tape 20, which is arranged so as to extend between the hubs through rollers 22 and tape guide pins 24 each arranged in the casing 10 and a head receiving recess 26 formed at the front portion of the casing 10 and be reversibly wound on the hubs 18, resulting in forming tape windings 28 each comprising the hub 18 and the portion of the magnetic tape 20 wound on the hub 18.

Between the tape windings 28 and the casing 10 or the upper and lower casing members 12 and 14 are arranged a pair of sheet elements 30, e.g. springs, in a manner to extend in the longitudinal direction of the casing 10 or substantially between both lateral sides of the casing and interpose the tape windings 28 therebetween.

The sheet elements 30 each may be made of a sheet material of a large size such as a polyethylene sheet, a polyester sheet, a polypropylene sheet, a graphite/teflon sheet or the like by punching or the like. Each of the sheet elements 30 is formed with a pair of apertures 32 through which the hubs 18 are inserted. The sheet elements 30 each are formed with a strip-like projection 34 which projects toward the casing member and extend in parallel to a center line 36 defined by connecting centers of the apertures 32 to each other in the longitudinal direction of the sheet element 30. The strip-like projection 34 is formed into a width larger than the diameter of the aperture 32. Also, the sheet element 30 is provided with one or more cutouts 38 which are adapted to be engaged with guide pins 39 to position the sheet element 30 in place in the casing 10.

Figure 3A:
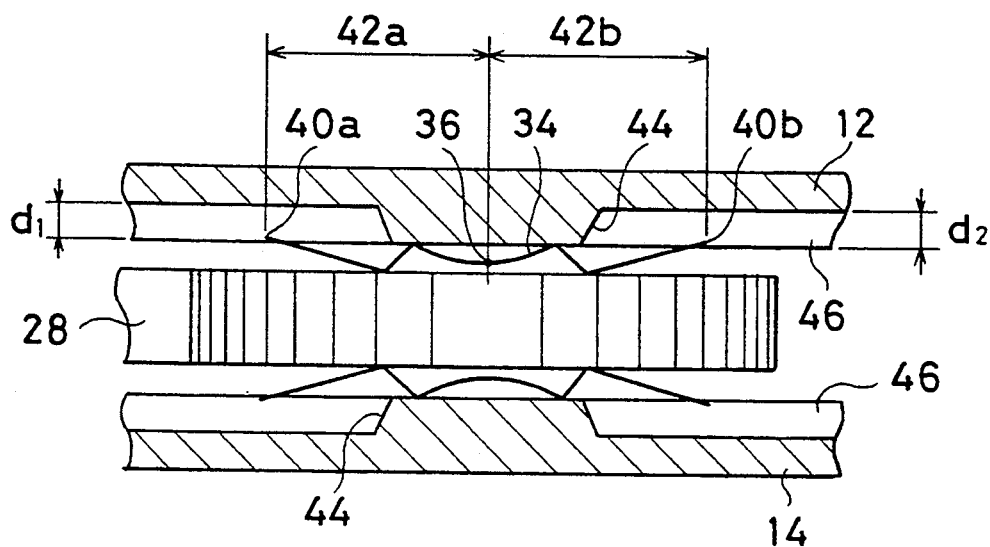
FIG. 3A is an enlarged vertical sectional view taken along line IIIA—IIIA of FIG. 1.

The sheet element 30 has both end edges 40a and 40b extending in the longitudinal direction thereof. The dimensional relationships between the apertures 32 and the end edges 40a and 40b are that distances 42a and 42b between the center line 36 and the end edges 40a and 40b are defined so as to be within the range of about 46 to 60% of the maximum radius R of each of the tape windings 28 (half of the width of the tape area) which is the radius of the tape winding 28 obtained by fully winding the tape on one of the hubs 18, resulting in preventing the end edges 40a and 40b from being contacted with the inner surface of the casing 10 when the tape windings 28 each are at such an intermediate or neutral position as shown in FIG. 3A or are not displaced. Thus, it will be noted that the illustrated embodiment is constructed in a manner different in the sheet element from the prior art described above wherein the sheet element is arranged so as to occupy substantially the whole tape area.

The distances or lengths 42a and 42b may be defined so as to be substantially the same. However, the distance 42a of the sheet element 30 on the front side of the cassette or casing 10 is preferably defined to be smaller than the distance 42b on the rear side of the casing 10 so that the ratio of the former to the latter is, for example, 3:4. Such arrangement of the distances 42a and 42b permits the taking-up of the magnetic tape 20 on the hub 18 to be smoothly carried out without causing distortion, misregistration and the like. The cutouts 38 are preferably provided on the side of the long distance 42b.

The casing 10 is provided on each of the upper and lower inner surfaces thereof or on each of the inner surfaces of the upper and lower casing members 12 and 14 with a land 44 so as to be positionally aligned with the strip-like projection 34 of the sheet element 30. The land 44 is formed into a width larger than the diameter of the hub hole 16 and in a manner to extend over substantially the whole length of the casing 10 in the longitudinal direction of the casing 10, resulting in receiving or supporting the strip-like projection 34 thereon.

The casing 10 is formed on each of the upper and lower inner surface thereof with a pair of depressions or recesses 46 so as to respectively extend along both sides of the land 44 in the longitudinal direction thereof while interposing the land 44 therebetween. The land 44, as shown in FIG. 3A, is formed into a width small sufficiently to permit both end edges 40a and 40b to overhang the depressions 46 when the sheet element 30 is put on the land 44.

As described above, the tape cassette of the illustrated embodiment is so constructed that the distances 42a and 42b between the center line 36 and the end edges 40a and 40b are defined to be as small as about 46 to 60% of the half of the width of the tape area or the half of the maximum radius R of the tape windings 2, resulting in being decreased as compared with the prior art, and the cassette casing 10 is provided on the portions of the upper and inner surfaces thereof opposite to the end edges 40a and 40b of the sheet element 30 with the depressions or recesses 46. Such construction effectively prevents the end edges 40a and 40b of the sheet element 30 from being contacted with the inner surfaces of the casing 10, as shown in FIG. 3A, at least when the tape 28 windings are at the neutral position.

Figure 3B:
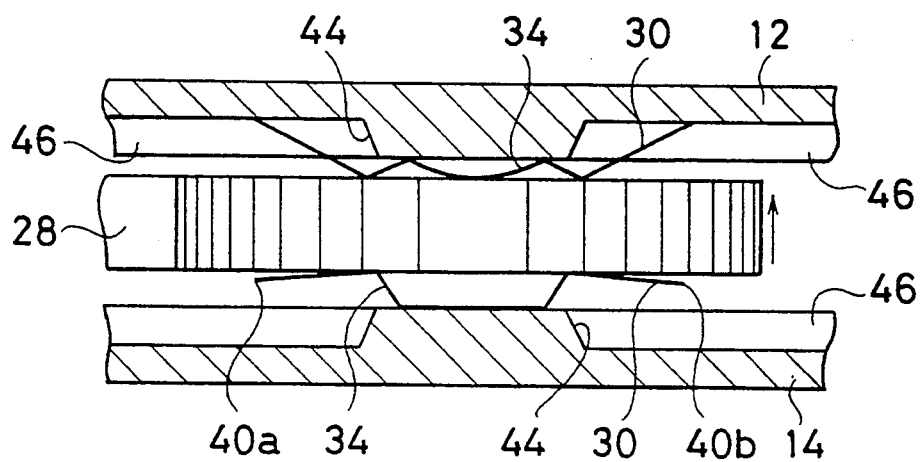

When the winding 28 is displaced, for example, in the upward direction as shown in FIG. 3B, the end edges 40a and 40b of the sheet element 30 on the side on which the tape winding 28 is displaced each are contacted with or abutted against the bottom surface of the recess 46, to thereby produce restoring force for returning the tape winding 28 to the neutral position.

The illustrated embodiment, as described above and shown in FIGS. 3A and 3B, is so constructed the distances 42a and 42b from the center line 36 to the end edges 40a and 40b are substantially equal to each other and the depths $d_1$ and $d_2$ of the recesses 46 on both sides of the land 44 of each of the upper and lower casing members 12 and 14 are defined to be substantially the same.

However, such dimensions may be defined so as to be different from each other.

Figure 4A:
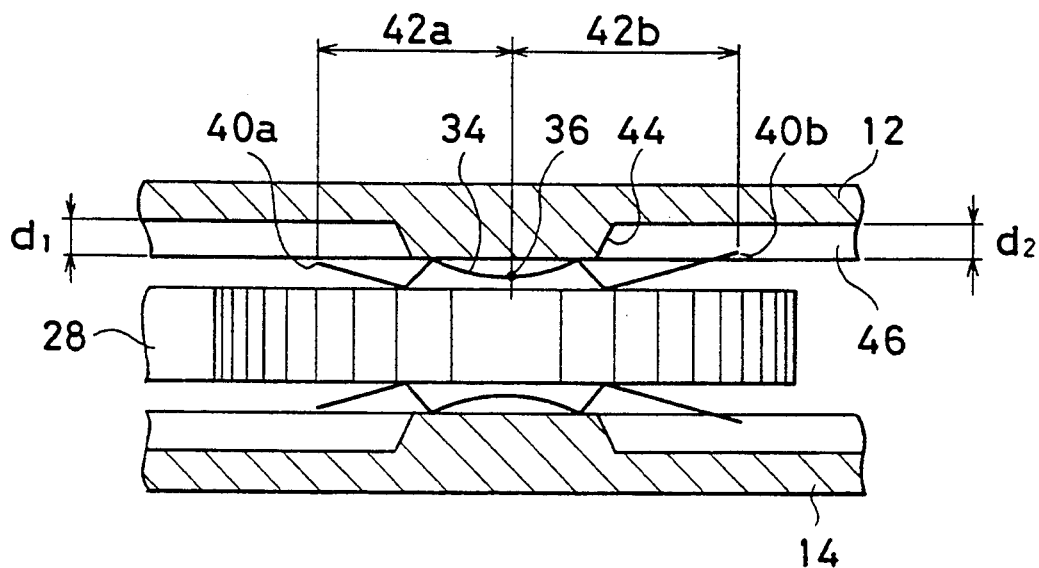
FIG. 4A is a fragmentary enlarged vertical sectional view similar to FIG. 3A which shows an essential part of another embodiment of a tape cassette according to the present invention.
Figure 4B:
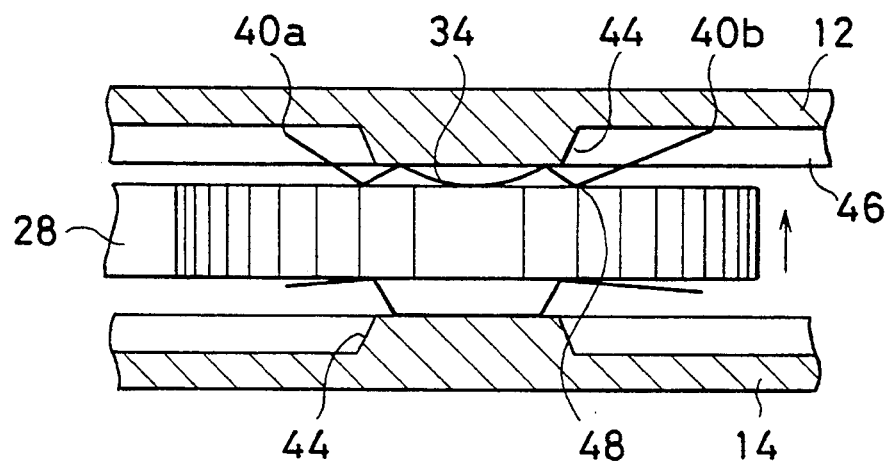
FIG. 4B is a fragmentary enlarged vertical sectional view similar to FIG. 4A wherein one of sheet elements is displaced.

FIGS. 4A and 4B show another embodiment of a tape cassette according to the present invention, which is constructed in such a manner that a distance 142a between a center line 136 and an end edge 140a of a sheet element 130 on the front side of a casing 110 is defined to be smaller than a distance 142b between the center line 136 and an end edge 140b of the sheet element 130 on the rear side of the casing 110. The remaining part of the embodiment may be constructed in substantially the same manner as the above-described embodiment of FIGS. 3A and 3B wherein similar elements have been denoted with an additional numeral "1" before the reference numerals of the elements.

Figure 5A:
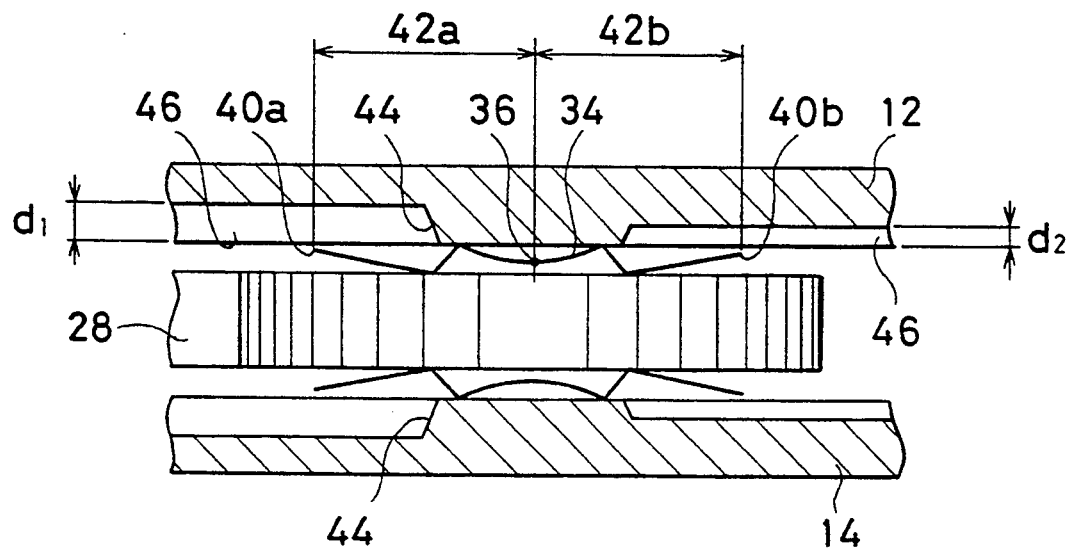
FIG. 5A is a fragmentary enlarged vertical sectional view similar to FIG. 3A which shows an essential part of still another embodiment of a tape cassette according to the present invention.
Figure 5B:
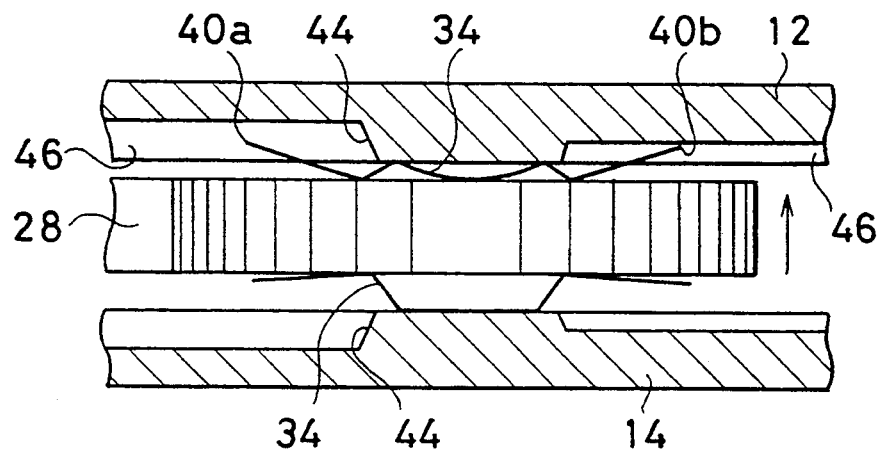
FIG. 5B is a fragmentary enlarged vertical sectional view similar to FIG. 5A wherein one of sheet elements is displaced.

FIGS. 5A and 5B show a further embodiment of a tape cassette according to the present invention. In a tape cassette of the embodiment, distances 242a and 242b between a center line 236 and both end edges 240a and 240b of a sheet element 230 are defined to be substantially the same and a depth $2d_1$ of one of recesses 246 of each of casing members 212 and 214 of a casing 210 is larger than that of the other recess 246. The remaining part of the embodiment may be constructed in substantially the same manner as the embodiments shown in FIGS. 1 to 3B wherein similar elements have been denoted with an additional numeral "2" before the reference numeral of the element.

Figure 6A:
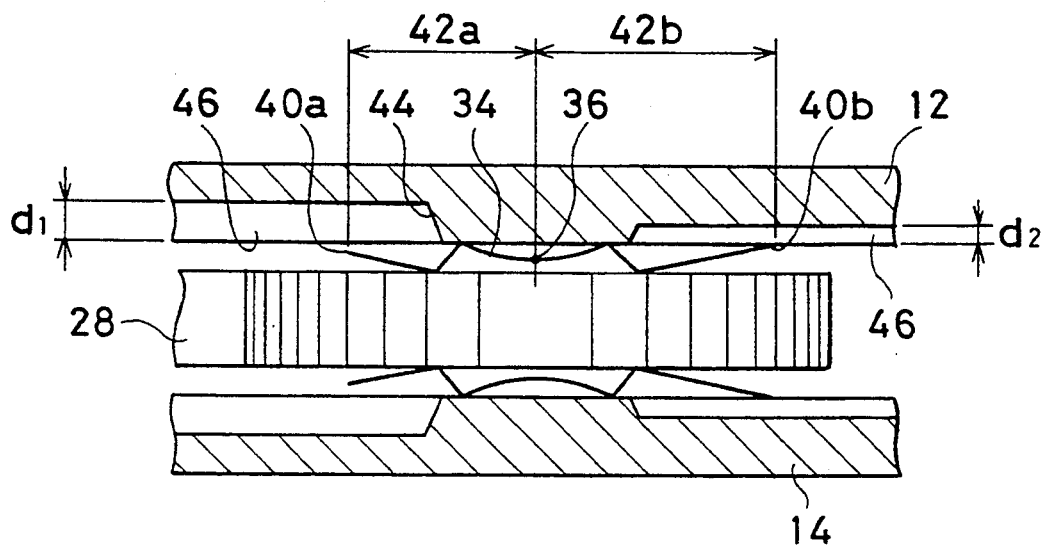
FIG. 6A is a fragmentary enlarged vertical sectional view similar to FIG. 3A which shows an essential part of a further embodiment of a tape cassette according to the present invention.
Figure 6B:
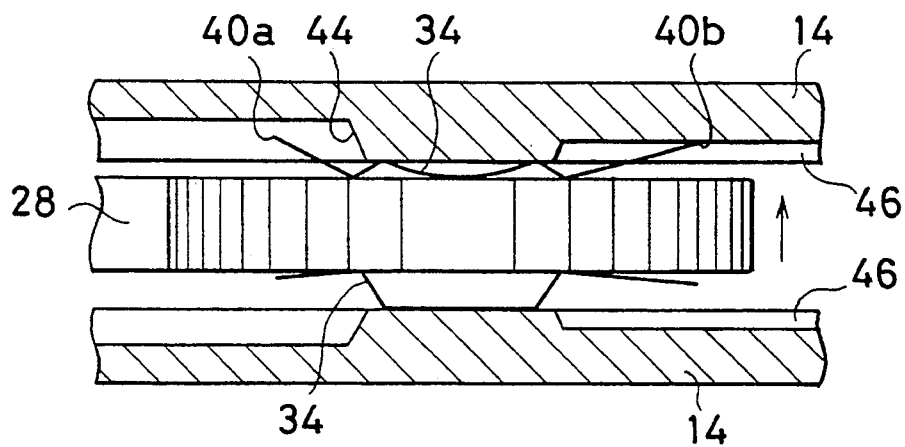
FIG. 6B is a fragmentary enlarged vertical sectional view similar to FIG. 6A wherein one of sheet elements is displaced.
Figure 7:
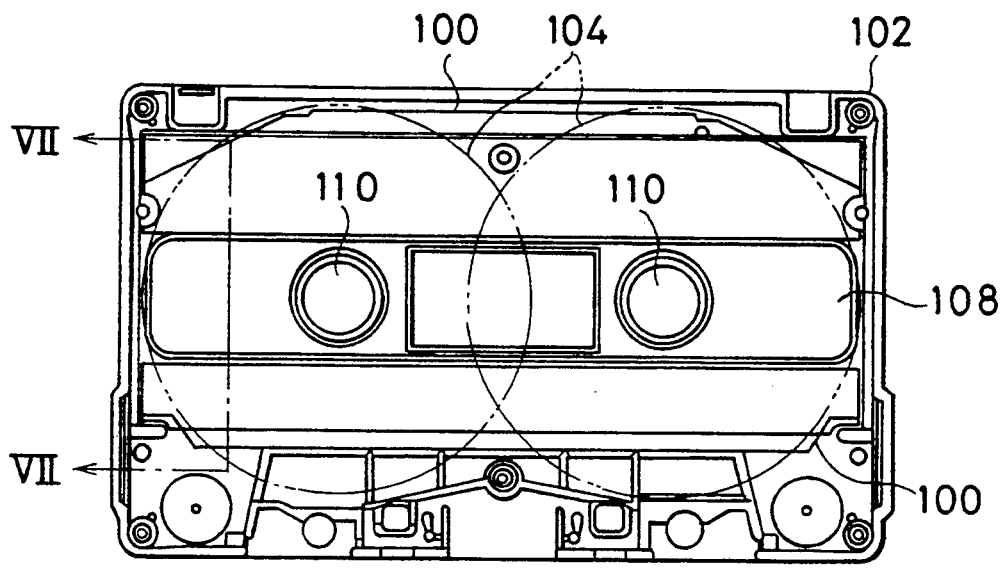
FIG. 7 is a plan view showing the lower half of a conventional tape cassette.
Figure 8:
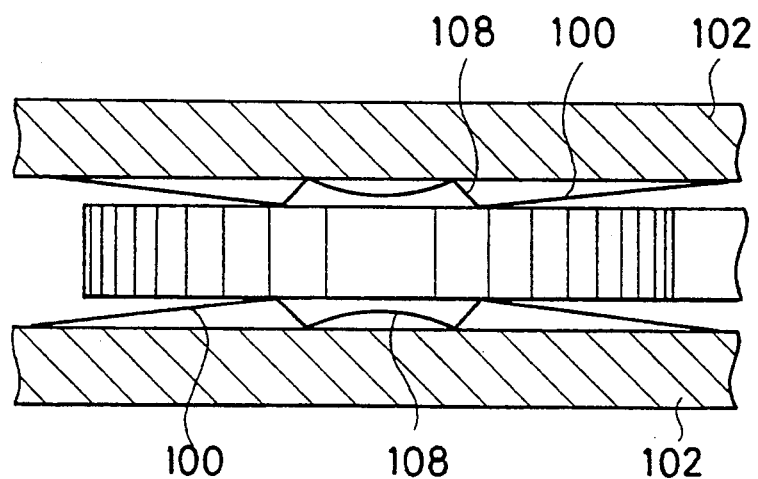
FIG. 8 is an enlarged vertical sectional view taken along line VII—VII of FIG. 7.

FIGS. 6A and 6B show still another embodiment of a tape cassette according to the present invention, wherein a distance 342a between a center line 336 and an end edge 340a of a sheet element 330 on the front side of a casing 310 is smaller than a distance 342b from the center line 336 to the other end edge 340b and a depth $3d_1$ is larger than a depth $3d_2$. The remaining elements of the embodiment illustrated in FIGS. 6A and 6B may be constructed in substantially the same manner as the embodiments shown in FIGS. 3A and 3B wherein similar elements have been denoted with an additional numeral "3" before the reference numerals of the elements.

In each of the embodiments shown in FIGS. 4 to 6, when a tape winding 128, 228, 328 is at a neutral position, both end edges 140a, 240a, 340a and 140b, 240b, 340b of the sheet element 130, 230, 330 are kept apart from the inner surface of the casing 110, 210, 310 as shown in FIGS. 4A, 5A and 6A; whereas, when the tape winding 128, 228, 328 is displaced, for example, in the upward direction, one of the end edges 140a, 240a, 340a and 140b, 240b, 340b or the end edge 140b, 240b, 340b is abutted against the inner surface of the casing 110, 210, 310 or the bottom surface of a recess 146, 246, 346, resulting in the sheet element 130, 230, 330 somewhat generating restoring force which forces back the tape winding 128, 228, 328. As in the embodiment shown in FIG. 1, the tape taking-up position of a hub 18 on the right side at which a magnetic tape 20 is wound on the hub 18 is defined between the center line 36 and the end edge 40b of the sheet element 30 on the rear side of the casing 10. Thus, when the sheet element 30 which has generated restoring force due to the abutment of the end edge 40b against the casing 10 abuts at the portion thereof indicated at reference numeral 48 against the hub 18 on the right side, so that the position of the magnetic tape 20 in the width direction thereof which is to be wound on the hub 18 may be regulated. This results in the magnetic tape 20 to be wound thereon being aligned with the side surface of the hub 18 on which a part of the tape has been already wound, so that the taking-up of the tape on the hub 18 may be smoothly carried out without causing distortion, misregistration and the like.

In the drawings, reference numeral 50 designates holes provided at the upper and lower casing members 12 and 14, through which screws are inserted to join the casing members 12 and 14 together. Reference numeral 52 is a pad, 54 is a positioning pin and 56 is a window.

As can be seen from the foregoing, the present invention is so constructed that the sheet elements each are formed with a pair of the apertures aligned with the hub holes and provided with the strip-like projection projecting toward the inner surface of the casing, the casing is formed on each of the upper and lower inner surfaces thereof with the land of a width larger than the diameter of the hub hole in a manner to face the projection of said sheet element, the casing is also formed on each of the upper and lower inner surfaces thereof with a pair of the recesses in a manner to interpose the land therebetween, the sheet elements each have a pair of the end edges extending in the longitudinal direction thereof, and the end edges of the sheet element are arranged so as to overhang the recesses of the casing. Such construction of the present invention permits the sheet element to exhibit a cushioning function sufficient to adequately hold the windings in the casing and stably travel the magnetic tape. Also, it not only permits satisfactory balance between the rigidity of the sheet element and its cushioning function to be set as desired over a wide range, to thereby substantially reduce damage to the magnetic tape, resulting in improve the quality of the tape cassette, but ensures satisfactory taking-up of the magnetic tape on the hubs without distortion, misregistration and the like. Further, it significantly decreases the width of the sheet element as compared in the prior art, to thereby reduce damage to the edges of the magnetic tape to a degree sufficient to ensure stable traveling of the tape and reduce the manufacturing cost of the tape cassette. Moreover, the present invention effectively eliminates bending of the sheet element and the like, so that the operation of incorporating it into the casing may be easily and safely carried out.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A tape cassette comprising:

a casing formed with a pair of hub holes, a center of said hub holes being aligned along a center axis of said casing, said center axis dividing said casing into a front portion and a rear portion, such that an end of said front portion opposing said center axis includes a magnetic head receiving recess. Said casing also including upper and lower inner surfaces, a pair of hubs rotatably arranged on said hub holes of said casing, respectively, a magnetic tape arranged between said hubs and reversibly wound on said hubs such that take-up positions for said magnetic tape on said hubs are located in said rear portion of said casing;

each of said hubs forming a tape winding in cooperation with the portion of said magnetic tape wound thereon; and a spring element interposed between each of said upper and lower inner surfaces of said casing and said tape windings, said spring elements being structured and arranged to provided a restoring force to said hubs when said magnetic tape is biased toward said upper or said lower surface due to an irregular taking-up motion;

said spring elements each being formed with a pair or apertures aligned with said hub holes and a projection projecting toward the respective inner surface of said casing, said projection having a substantially strip-like shape and extending in a longitudinal direction of said spring element;

said casing being formed on each of said upper and lower inner surfaces thereof with a land of a width larger than the diameter of said hub hole in a manner to face said projection of said spring element;

said casing being also formed on each of said upper and lower inner surfaces thereof with a pair of recesses in a manner to interpose said land therebetween;

said spring element having a front end edge and a rear end edge extending in the longitudinal direction thereof;

said end edges of said spring element being arranged so as to overhang said recesses of said casing, respectively, the distance from said front end edge to said center axis being smaller than the distance from said rear end edge to said center axis, such that when said tape windings are in an axially neutral position, said end edges are prevented from contacting said upper and lower inner surfaces, and when said tape windings are biased toward one of said upper or lower inner surfaces, at least initially, only said rear end edges of a corresponding one of said spring elements abuts against said one of said upper or lower inner surfaces in proximity to said take-up positions.

2. A tape cassette as defined in claim 1, wherein said spring element is so formed that distances between a center line defined by connecting the centers of said apertures to each other and said end edges are within the range of about 46 to 60% of the maximum radius of said tape windings.

3. A tape cassette as defined in claim 1, wherein said distances are so defined that the ratio of the distance between a center line defined by connecting the centers of said apertures to each other and the end edge of said spring element on the front side of said casing to the distance between said center line and the end edge of said spring element on the rear side of said casing is about 3:4.

4. A tape cassette as defined in claim 1, wherein said spring element is provided with at least one cutout for positioning said spring element in said casing;

said cut-out being arranged at the portion of said sheet element having said larger distance.

5. A tape cassette as defined in claim 1, wherein said recesses of each of said upper and lower inner surfaces of said casing are formed so as to have depths different from each other.

* * * * *